US011151166B2

(12) United States Patent
Li et al.

(10) Patent No.: US 11,151,166 B2
(45) Date of Patent: Oct. 19, 2021

(54) CONTEXT-BASED MULTI-GRANULARITY INTENT DISCOVERY

(71) Applicant: Microsoft Technology Licensing, LLC, Redmond, WA (US)

(72) Inventors: Ziliu Li, Bellevue, WA (US); Junaid Ahmed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 16/502,360

(22) Filed: Jul. 3, 2019

(65) Prior Publication Data
US 2021/0004390 A1 Jan. 7, 2021

(51) Int. Cl.
*G06F 17/00* (2019.01)
*G06F 16/28* (2019.01)
*G06F 16/22* (2019.01)

(52) U.S. Cl.
CPC ........ *G06F 16/285* (2019.01); *G06F 16/2246* (2019.01)

(58) Field of Classification Search
CPC .......................... G06F 16/285; G06F 16/2246
See application file for complete search history.

(56) References Cited

U.S. PATENT DOCUMENTS 8,583,626 B2 * 11/2013 Mandelstein ......... G06F 16/254
707/714
9,250,993 B2 * 2/2016 Mani ..................... G06F 16/285

2012/0233170 A1 * 9/2012 Musgrove .......... G06Q 30/0609
707/740
2015/0012847 A1 * 1/2015 Lawler .................... H04L 51/26
715/753
2018/0268456 A1 9/2018 Kumar et al.

FOREIGN PATENT DOCUMENTS

WO 2017165040 A1 9/2017

OTHER PUBLICATIONS

J. Yuan and X. Liu, "Transform Residual K-Means Trees for Scalable Clustering," 2013 IEEE 13th International Conference on Data Mining Workshops, Dallas, TX, 2013, pp. 489-496, doi: 10.1109/ICDMW.2013.110, Dec. 2013.*

(Continued)

*Primary Examiner* — Greta L Robinson

(57) ABSTRACT

Context-based multi-granularity intent discovery, in relation to determining the intent of a user-problem associated with one of a plurality of products, includes identifying each of the plurality of products in a base intent level of a hierarchical intent data structure, creating a first granularity level below the base intent level, and creating a subsequent granularity level. The first granularity level includes groupings of the plurality of user-problems created according to a first common intent feature; the common intent feature is related to a respective one of the plurality of products. The subsequent granularity level includes sub-groupings of the user-problems of a respective grouping with each sub-grouping created according to a second common intent feature. The second common intent feature of each sub-grouping is determined without consideration of the first common intent feature.

20 Claims, 9 Drawing Sheets

(56) References Cited

OTHER PUBLICATIONS

W. Jiajia, L. Yezheng, J. Yuanchun, S. Chunhua, S. Jianshan and D. Yanan, "Clustering Product Features of Online Reviews Based on Nonnegative Matrix Tri-factorizations," 2016 IEEE First International Conference on Data Science in Cyberspace (DSC), Changsha, pp. 199-208, doi: 10.1109/DSC.2016.32, Jun. 2016.*

"International Search Report and Written Opinion Issued in PCT Application No. PCT/US2020/037348", dated Aug. 26, 2020, 11 Pages.

* cited by examiner

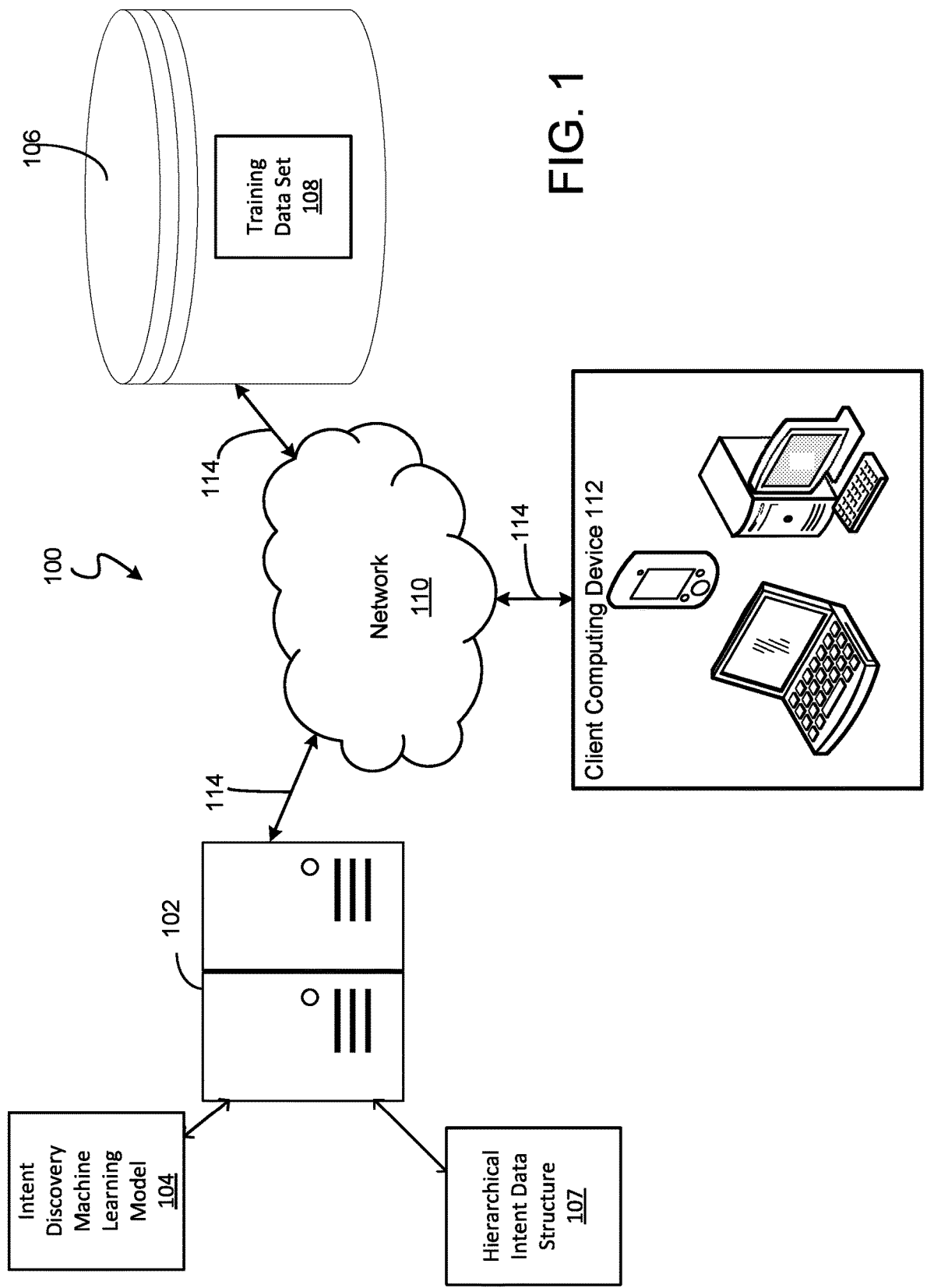

CONTEXT-BASED MULTI-GRANULARITY INTENT DISCOVERY

BACKGROUND

A chatbot generally comprises a computing device executing a software program that enables the computing device to communicate with humans by voice or text. Chatbots have become a valuable tool in customer care enabling customers to pose questions about a product or service and quickly receive an answer to their question. Key to customer satisfaction, when interfacing with a chatbot, is the chatbot's ability to accurately identify the intent of the customer's question and provide an appropriate reply. The ability to identify the intent of a user-problem question can be straight-forward when dealing with a lone product or service. However, the ability to accurately identify intent of a verbal or text user-problem becomes invariably more complicated when dealing with families of products, or services, where a customer's question can cross multiple products, or services, or where a customer's natural language can vary in using different terms or expressions to imply the same intent. A family of products, or services can be exemplified by Microsoft whose customers may pose questions, e.g., user-problems, about any number of Microsoft products. Microsoft products can include, for example, productivity applications such as Word, Excel, Outlook, OneNote, OneDrive, PowerPoint and the like, a suite of productivity applications such as Office, an operating system such as Windows or any other Microsoft product offering.

It is with respect to the above and other general considerations to which aspects of the present disclosure are directed.

SUMMARY

The present disclosure is directed to methods, systems and articles of manufacture that detect intent in a verbal or text statement, which may or may not be in the form of a question. The present disclosure is particularly suited to detecting intent of a user-problem in relation to a product, and is described herein in a such a context, however the functionality of the methods, system and articles of manufacture described herein are also applicable to detecting intent of statements when the statements can be divided in a top-down, hierarchical manner.

The present disclosure is directed to detecting intent in a verbal (e.g., spoken) or text user-problem. The user-problems are posed by product-users in relation to one or more products from a family (plurality) of products, such as Microsoft's family of products. The intent of a user-problem posed, for example, to a chatbot or other user-responsive application, can be determined through context-based multi-granularity intent discovery (hereafter "the intent discovery") as disclosed herein. The intent discovery is achieved through a hierarchical framework established with a machine learning model that is trained with a data set that includes previously known user-problems. Each granularity level within the hierarchical framework is associated with an intent level with each intent within the intent level being determined using a classification algorithm or clustering algorithm (as appropriate to the data).

A first intent level is established before establishing a second intent level, and so on, to establish a top-down hierarchy of intent levels. A determined intent is maintained at a certain intent level when the determined intent contains at least a predetermined number of user-problems and/or a sufficient density of user-problems that meet a predetermined degree of cohesiveness based on one or more identified key intent features. When all intents of a granularity level are determined, a new granularity level is established beneath the previous granularity level with the new granularity level using the classification or clustering algorithms (as appropriate to the data) to determine the intents of the new granularity level. The intents of the new granularity level are determined based on the user-problems existing under the parent intent (e.g., the new granularity level knows the context of the previous intent in the previous granularity level). However, the key intent features used to establish the previous granularity level are removed from consideration in the training set. Each subsequent granularity level is determined similarly, with the key intent features of each parent intent of the prior granularity levels known to the new granularity level but removed from the training set. As a machine learning model, the intent discovery, when trained, can be activated in a live environment and continue to improve upon the intents of each granularity level based on learning from live user-problems.

The intent discovery of the present disclosure helps to address skew that can occur in training data, and live data, by removing noise (e.g., long tail) user problems through focused granularity levels. Further, in each granularity level, the intent discovery is aware of its context (e.g., the intent of the parent intents in the previous granularity levels) but focuses on new content features of a smaller data set to improve intent discovery quality based on the removal of parent intents from consideration in determining new intents at a new granularity level.

In certain aspects the present disclosure is directed to context-based multi-granularity intent discovery, in relation to determining the intent of a user-problem associated with one of a plurality of products. The intent discovery includes identifying each of the plurality of products in a base intent level of a hierarchical intent data structure, creating a first granularity level below the base intent level, and creating a subsequent granularity level. The first granularity level includes groupings of the plurality of user-problems created according to a first common intent feature where the common intent feature is related to a respective one of the plurality of products. The subsequent granularity level includes sub-groupings of the user-problems of a respective grouping with each sub-grouping created according to a second common intent feature. The second common intent feature of each sub-grouping is determined without consideration of the first common intent feature.

This Summary is provided to introduce a selection of concepts in a simplified form that are further described below in the Detailed Description. This Summary is not intended to identify key or essential features of the claimed subject matter, not is it intended to be used to limit the scope of the claimed subject matter.

BRIEF DESCRIPTION OF THE DRAWINGS

Non-limiting and non-exhaustive examples are described with reference to the following Figures.

FIG. 1 is a system for utilizing context-based multi-granularity intent discovery.

DETAILED DESCRIPTION

Figure 2A:
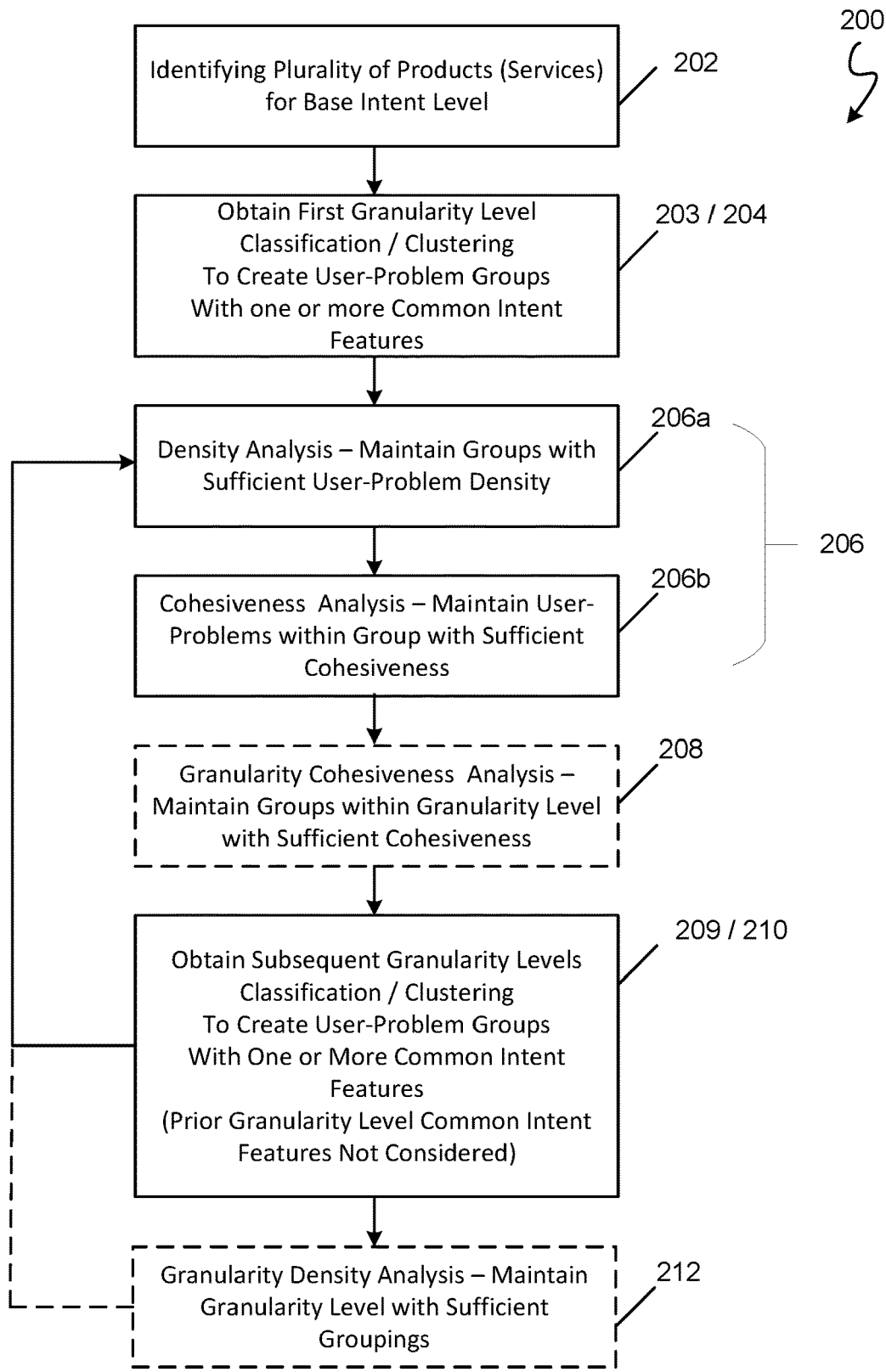
FIG. 2A is a flow chart of a context-based multi-granularity intent discovery process.

In the following detailed description, references are made to the accompanying drawings that form a part hereof, and in which are shown by way of illustration, specific aspects or examples. The various aspects can be practiced as methods, systems or devices. Accordingly, various aspects can take the form of a hardware implementation, an entirely software implementation or an implementation combining both hardware and software. The following detailed description is, therefore, not to be taken in a limiting sense, and the scope of the present disclosure is defined by the appended claims and their equivalents.

The present disclosure is directed to detecting intent in a verbal (e.g., spoken) or text user-problem. The user-problems are posed by product-users in relation to one or more products from a family (plurality) of products, such as Microsoft's family of products. The intent of a user-problem posed, for example, to a chatbot or other user-responsive application, can be determined through context-based multi-granularity intent discovery (hereafter "the intent discovery") as disclosed herein. The intent discovery is achieved through a hierarchical framework established with a machine learning model that is trained with a data set that includes previously known user-problems. Each granularity level within the hierarchical framework is associated with an intent level with each intent within the intent level being determined using a classification algorithm or clustering algorithm (as appropriate to the data).

A first intent level is established before establishing a second intent level, and so on, to establish a top-down hierarchy of intent levels. A determined intent is maintained at a certain intent level when the determined intent contains at least a predetermined number of user-problems and/or a sufficient density of user-problems that meet a predetermined degree of cohesiveness based on one or more identified key intent features. When all intents of a granularity level are determined, a new granularity level is established beneath the previous granularity level with the new granularity level using the classification or clustering algorithms (as appropriate to the data) to determine the intents of the new granularity level. The intents of the new granularity level are determined based on the user-problems existing under the parent intent (e.g., the new granularity level knows the context of the previous intent in the previous granularity level). However, the key intent features used to establish the previous granularity level are removed from consideration in the training set. Each subsequent granularity level is determined similarly, with the key intent features of each parent intent of the prior granularity levels known to the new granularity level but removed from the training set. As a machine learning model, the intent discovery, when trained, can be activated in a live environment and continue to improve upon the intents of each granularity level based on learning from live user-problems.

FIG. 1 illustrates an operating environment 100 in which aspects of context-based multi-granularity intent discovery ("intent discovery") may be practiced. As illustrated, the environment 100 can comprise a computing device 102, such as one or more server computing devices, containing an intent discovery machine learning model 104. The computing device 102 is in communication with a storage device 106, which may be local or remote to the computing device 102. The storage device contains a training data set 108 used to train the intent discovery machine learning model 104. The discovery machine learning model 104 generates a hierarchical intent data structure 107 (also see example in FIG. 3) that is stored in a memory of the computing device 102. Once trained, the intent discovery machine learning model 104 can operate in a live mode on the computing device 102 where it can be remotely accessed by a client computing device 112, via a browser, a productivity application, or other like application, on one or more communication channels 114 over a network 110. In certain aspects, the intent discovery machine learning model 104 can be executed locally on a computing device. Further details regarding operating environments in which aspects of the present disclosure may be practiced are provided in FIGS. 4-7.

The intent discovery machine learning model 104 incorporates one or more of machine learning strategies and deep learning strategies to achieve context-based multi-granularity intent discovery as described herein. FIG. 2 is a flowchart illustrating an example of an intent discovery process that may be utilized within the machine learning or deep learning strategies.

Referring to FIG. 2A, the intent discovery process 200 begins with an identifying process 202 of identifying the plurality of products to be included in a hierarchical data structure of intent. The products can be identified with a name or other identifier that may be included in the verbal or text content of a user-problem; each name, or other identifier, is the base intent node at a base intent level of a hierarchical intent data structure.

With the products established in the intent base level, a first granularity level under each of the base intent nodes is obtained from the training data set, e.g. training data set 108 of FIG. 1.

The training data set comprises user-problems posed in relation to the operation, usage, characteristics, or other parameters for which a user-problem query can be generated, of one or more products identified in the base intent level. The user-problem can be posed in natural language and may be a voiced user-problem converted to text or an original text user problem. The user-problem can additionally include identifying meta-data text that is usable as training data reflective of the user-problem. As indicated herein, the one or more products are from a plurality of products. In certain aspects, the plurality of products are grouped as a family of products or as a plurality of products linked by one or more commonalities. The commonalities may exist only name, e.g. products from a common manufacturer, or the commonality may exist in another form such as common operation, common interoperability, common subject matter, or any other commonality that can be found among products (or services). As noted herein, a family of products, or services can be exemplified by Microsoft product offerings (commonality—all sold by Microsoft) that can include productivity applications such as Word, Excel, PowerPoint, Outlook, OneNote, OneDrive and the like (commonality-interoperability), a suite of productivity applications such as Office (commonality-software suite), an operating system (commonality—able to execute productivity applications), etc.

Referring once again to FIG. 2A, the first granularity level is created using one or both of a classification process 203 and a clustering process 204 to determine groupings of one or more user-problems that have a common intent feature. The groupings are specific to each intent base node. Common intent features at this first granularity level can relate to very basic user-problems identified within the training data set such as user-problems on how to launch the product, how to open a document within the product, how to print from the product, etc.

Each grouping of user-problems with an identified common intent feature is then subjected to a trimming process 206. The trimming process 206 includes one or both of density analysis 206a and a cohesiveness analysis 206b, performed in any desired order.

The density analysis 206a includes determining whether each grouping contains at least a predetermined minimum number of user-problems. If the grouping does not contain the minimum number of user-problems, the grouping is eliminated from the first granularity level.

The cohesiveness analysis 206b includes applying a distance/similarity strategy to the user-problems within each grouping. In applying the distance/similarity strategy the intent discovery process 200 calculates a similarity for every possible user-problem pair within the grouping and then measures the correlation (e.g., how closely related) of each user-problem pair based on the data content (e.g., natural language of user-problem, meta-data of user-problem, etc.) of each user-problem. The correlation of each user-problem pair can be measured using an appropriate strategy such as average, variance and the like. Those user-problem pairs meeting or exceeding a predetermined correlation threshold are maintained within the grouping while those user-problem pairs below the threshold are eliminated.

Alternatively, or in addition, the cohesiveness analysis 206b includes applying a distance/similarity for each user-problem within the grouping to a core problem within the grouping. The core problem is the user-problem in the grouping that is determined to be the most highly correlated to the other user-problems in the grouping. Each of the non-core user-problems are paired with the core problem to measure the correlation (e.g., how closely related) the non-core user problem is to the core problem based on the content (e.g., natural language of user-problem, meta-data of user-problem, etc.) of the core and non-core user problems. The correlation of each non-core user problem to the core-user problem can be measured using an appropriate strategy such as average, variance and the like. Those non-core user-problems meeting or exceeding a correlation threshold with the core problem of the grouping are maintained within the grouping while those non-core user problems not meeting the correlation threshold are eliminated from the grouping.

After applying the cohesiveness analysis 206b to each of the groupings, a granularity cohesiveness analysis 208 can be applied on a granularity (e.g., group) level in the first granularity.

The granularity cohesiveness analysis 208 includes calculating a similarity for every possible grouping pair within the granularity level and then measures the correlation (e.g., how closely related) of each grouping pair based on the content of each grouping. The correlation of each grouping pair can be measured using an appropriate strategy such as average, variance and the like. Those grouping pairs meeting or exceeding a predetermined correlation threshold are maintained within the granularity level while those grouping pairs below the threshold are eliminated.

Alternatively, or in addition, the granularity cohesiveness analysis 208 includes applying a distance/similarity for each grouping within the granularity level to a core grouping within the granularity level. The core grouping is the grouping in the granularity level that is determined to be the most highly correlated to the other groupings in the granularity level. Each of the non-core groupings are paired with the core grouping to measure the correlation (e.g., how closely related) of the non-core grouping to the core grouping based on the content of the core and non-core groupings. The correlation of each non-core grouping to the core grouping can be measured using an appropriate strategy such as average, variance and the like. Those non-core groupings meeting or exceeding a correlation threshold with the core grouping of the granularity level are maintained within the granularity level while those non-core groupings not meeting the correlation threshold are eliminated from the granularity level.

The groupings of user-problems that survive the trimming process 206 remain in the first granularity level with each remaining grouping being identified with one or more common intent features. Examples of common intent features include key words, key phrases, or key metadata or other common data extracted and enriched from the user-problems of the training data set.

With the first granularity level established, the intent discovery process 200 creates a subsequent granularity level for each grouping of the first granularity level. The subsequent granularity level is obtained using one or both of a classification process 209 and a clustering process 210 on the user-problems within the respective grouping. The classification and/or clustering process 210 produces one or more new sub-groupings for the subsequent granularity level that have one or more common intent features that are different from the one or more common intent features identifying the parent grouping in the first granularity level. In determining the sub-groupings for the subsequent granularity level, the one or more common intent features that were used to identify each specific parent grouping in the first granularity level are removed from consideration. For example, if a specific one of the parent groupings in the first granularity level is identified with one or more common intent features, e.g., common keywords such as "Office," "open," "print," "database," these common intent features are eliminated from consideration when the classification and/or clustering process 210 is performed in the subsequent granularity level.

In certain aspects, the one or more common intent features from all prior parent granularity levels can be removed from consideration in determining new sub-groupings for subsequent granularity levels. In certain aspects, the one or more common intent features from only the immediately prior parent granularity level, or a specified number of prior parent granularity levels, can be removed from consideration when the classification and/or clustering of user-problems into new sub-groupings at a subsequent granularity level is performed. New sub-groupings of the subsequent granularity level are then submitted to the trimming process 206. As such, each sub-grouping within a subsequent granularity level is presented with user-problems that already have known-context (e.g., the common intent features of prior parent granularity levels), yet the known-context is removed for generating sub-groupings in the subsequent level classification process 209 and/or clustering process 210. The known-context is also removed when the trimming process 206 is performed on the sub-groupings of the subsequent granularity level; correlation scores among sub-groupings of user-problems are focused on common intent features not previously used for correlations helping to more accurately determine the intent of the user-problems under consideration.

In certain aspects, as the levels of granularity grow, a granularity density analysis 212 can be performed. The granularity density analysis 212 includes determining whether each granularity level contains at least a predetermined minimum number of groupings. If the granularity level does not contain the minimum number of groupings, the granularity level (as well as those granularity levels depending therefrom) are eliminated.

Each granularity of level within the hierarchy of intents can be continuously monitored and updated under the intent discovery process 200 as more training user-problems or live user-problems are received. For example, granularity levels can be added or deleted, groupings can be added or deleted from a granularity level, and user-problems can be added or deleted from a grouping.

The intent discovery process 200 can be implemented as a live machine learning model within a chatbot, or other user-interactive application, accessed locally or remotely from a client computing device.

Figure 2B:
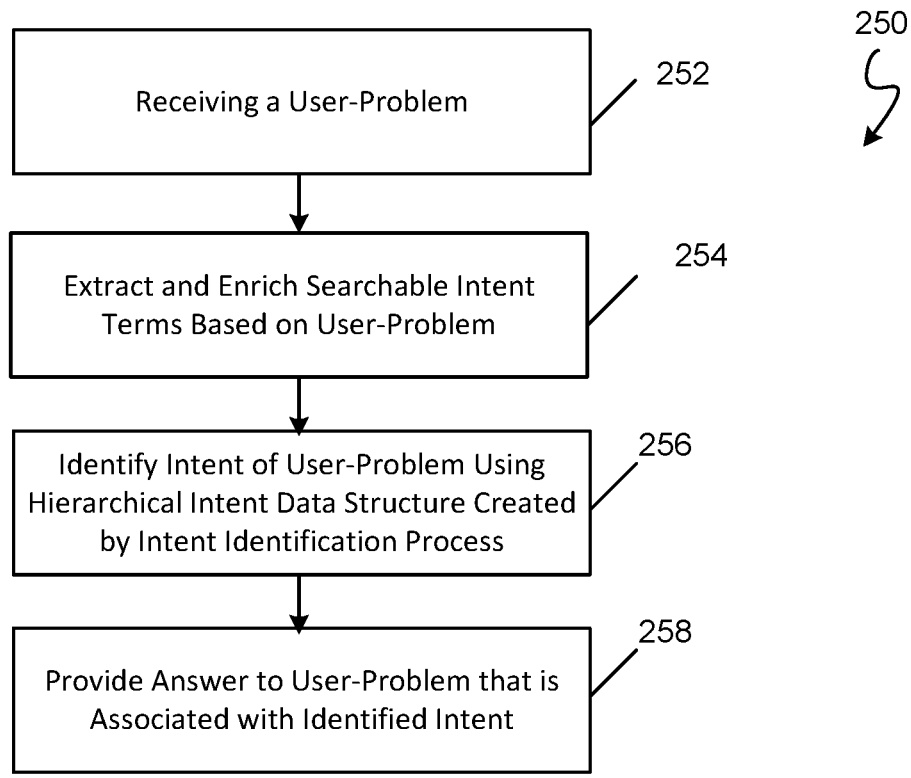
FIG. 2B is a flow chart of an intent identification process.

FIG. 2B illustrates an example of intent identification process 250, executable on a computing device, that utilizes the intent discovery process 200. The intent discovery process 250 begins with receiving a user-problem 252 (e.g., a voice query translated to text or a text query) from a user of the client computing device. Extracting and enriching of searchable intent terms of the user-problem 254 then occurs to identify searchable intent terms such as one or more key words, key phrases, metadata or other extractable information that can be used by the intent discovery process 200. In certain aspects, the extracting process is enriched for context. For example, the user-problem may be posed with specific words or phrases but an enhancement model can be used to generate enhancement words, phrases or other terms that are similar to the specific words or phrases in a same or similar context as the posed user-problem. The generated enhancement content can be included as elements of the extracted data to improve the ability to identify the possible intent of the posed user-problem.

The extracted and enhanced data is then acted upon 256 using the hierarchical intent data structure created by the intent discovery process 200 to find a grouping or sub-grouping within the hierarchical intent data structure that most closely correlates to the extracted and enhanced data of the user-problem with a correlation calculation (e.g., average, variance and the like). Correlation calculations are performed, relative to the various groupings/sub-groupings, until a predetermined correlation threshold of granularity is reached. The correlation calculations determine the correlation between the extracted and enhanced data and the one or more common intent features of the respective grouping or sub-grouping. One or more answers to user-problems associated with the common intent features of the one or more of the most closely correlated grouping or sub-grouping are then provided 258 (e.g. voiced or displayed) responsive to the user-problem.

As should be appreciated, processes 202-212 are described for purposes of illustrating the present methods and systems and are not intended to limit the disclosure to a particular sequence of steps, e.g., steps may be performed in a differing order, additional steps may be performed and disclosed steps may be excluded without departing from the present disclosure.

Figure 3:
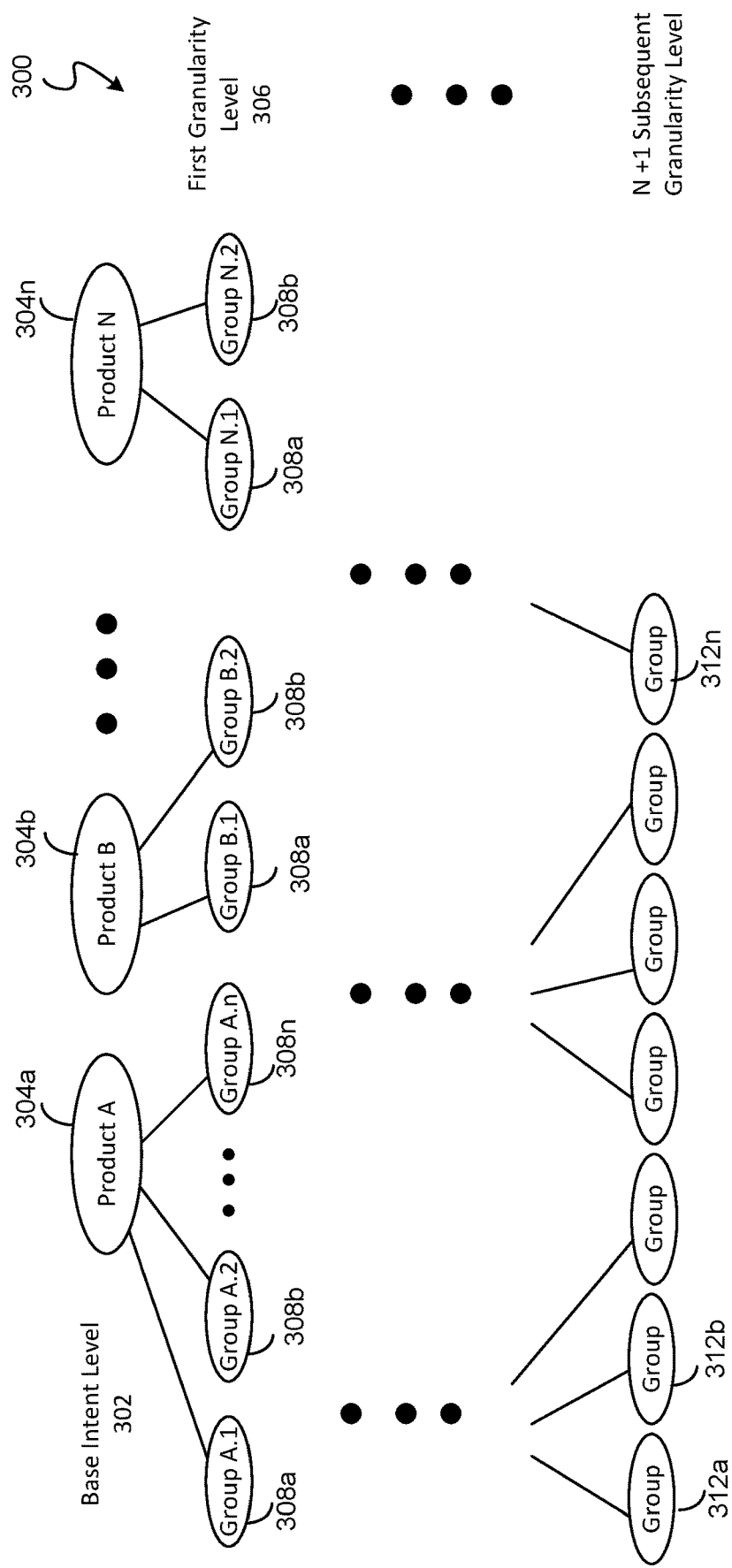
FIG. 3 is a simplified example of hierarchical data structure of user-problem intent.

FIG. 3 provides a simplified diagram of a hierarchical intent data structure 300 established through the intent discovery process of FIG. 2. The base intent level 302 includes a plurality of base intent groupings 304*a*, 304*b*, . . . 304*n* with each representative of a product or service. The first granularity level 306 includes one or more groupings 308*a*, 308*b*, . . . 308*n*, with each grouping representing a common intent feature of the user-problems in the grouping. The subsequent N+1 granularity levels each include one or more groupings 312*a*, 312*b* . . . 312*n*, with each grouping representing a common intent feature of the user-problems in the grouping that were determined under the intent discovery process 200 without consideration of the common intent features of one or more prior granularity levels.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, as described herein.

Figure 4:
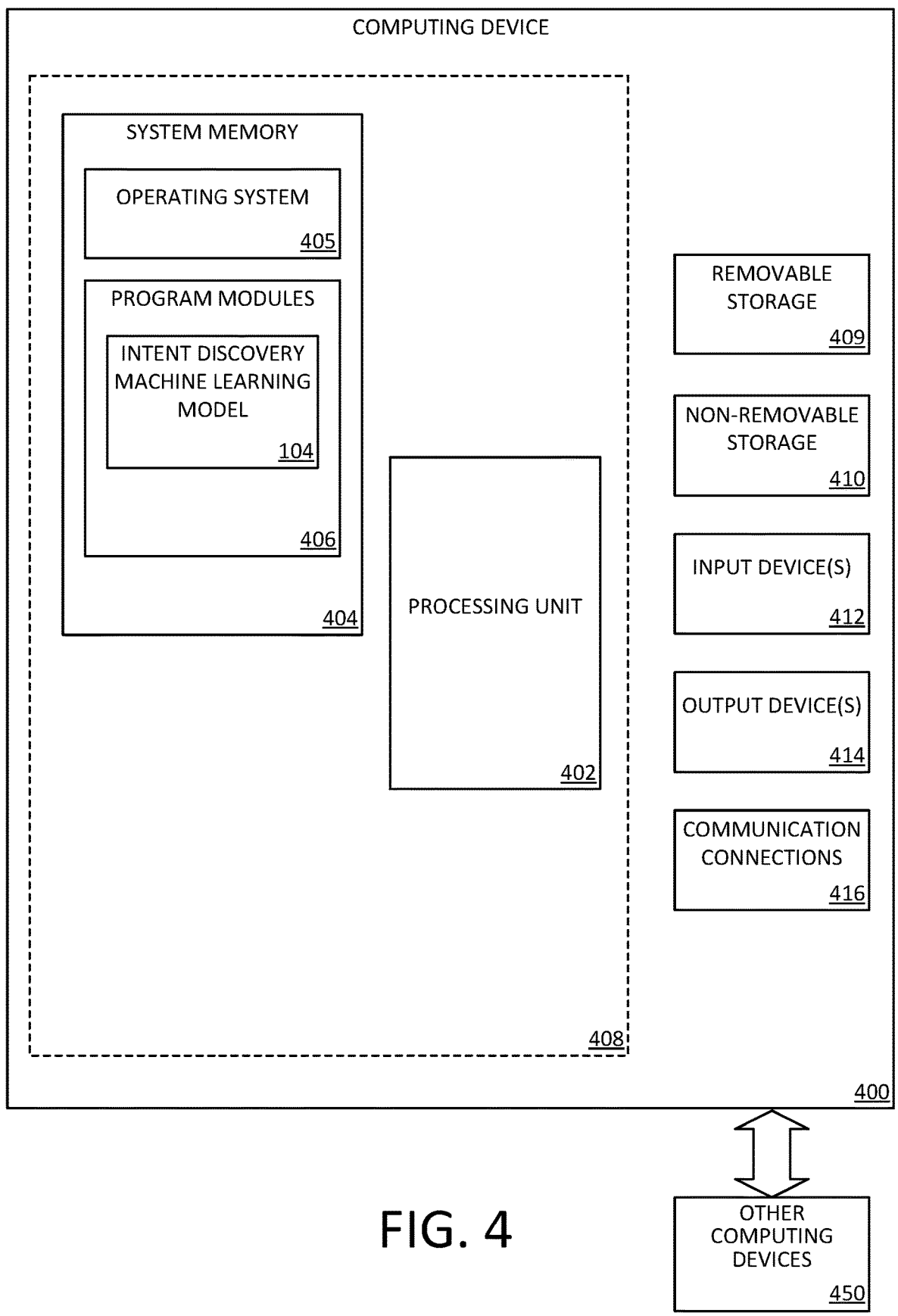
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may have computer executable instructions for implementing context-based multi-granularity intent discovery on a computing device (e.g., computing device 102 or client computing device 112), including computer executable instructions for the intent discovery machine learning model 104 that can be executed to implement the methods disclosed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 such as the intent discovery machine learning model 104 of FIG. 1.

The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410. Any number of program modules and data files may be stored in the system memory 404. While executing on the processing unit 402, the program modules 406 (e.g., intent discovery machine learning model 104) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
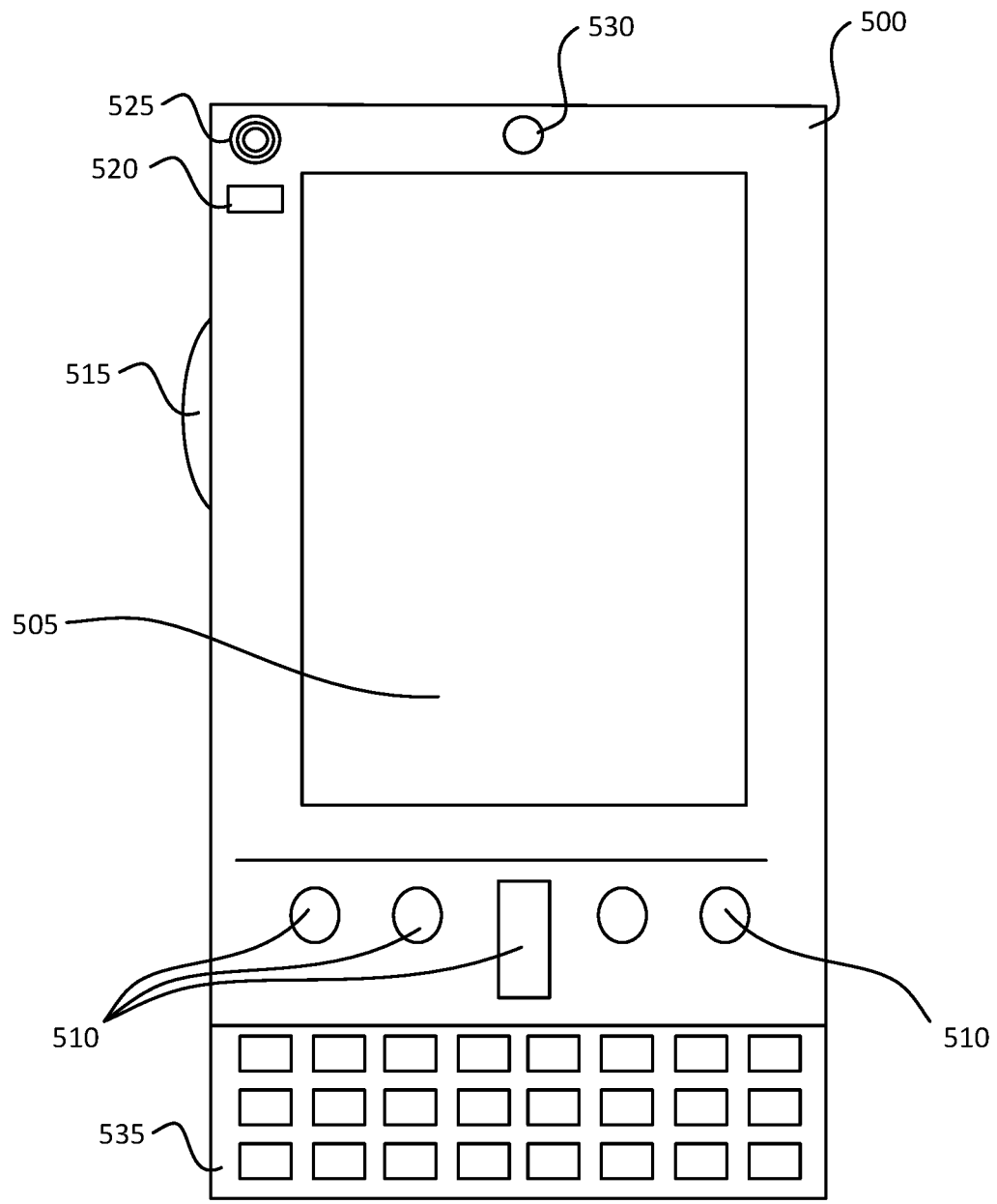
FIGS. 5A and 5B are simplified block diagrams of a mobile computing device with which aspects of the present disclosure may be practiced.
Figure 5B:
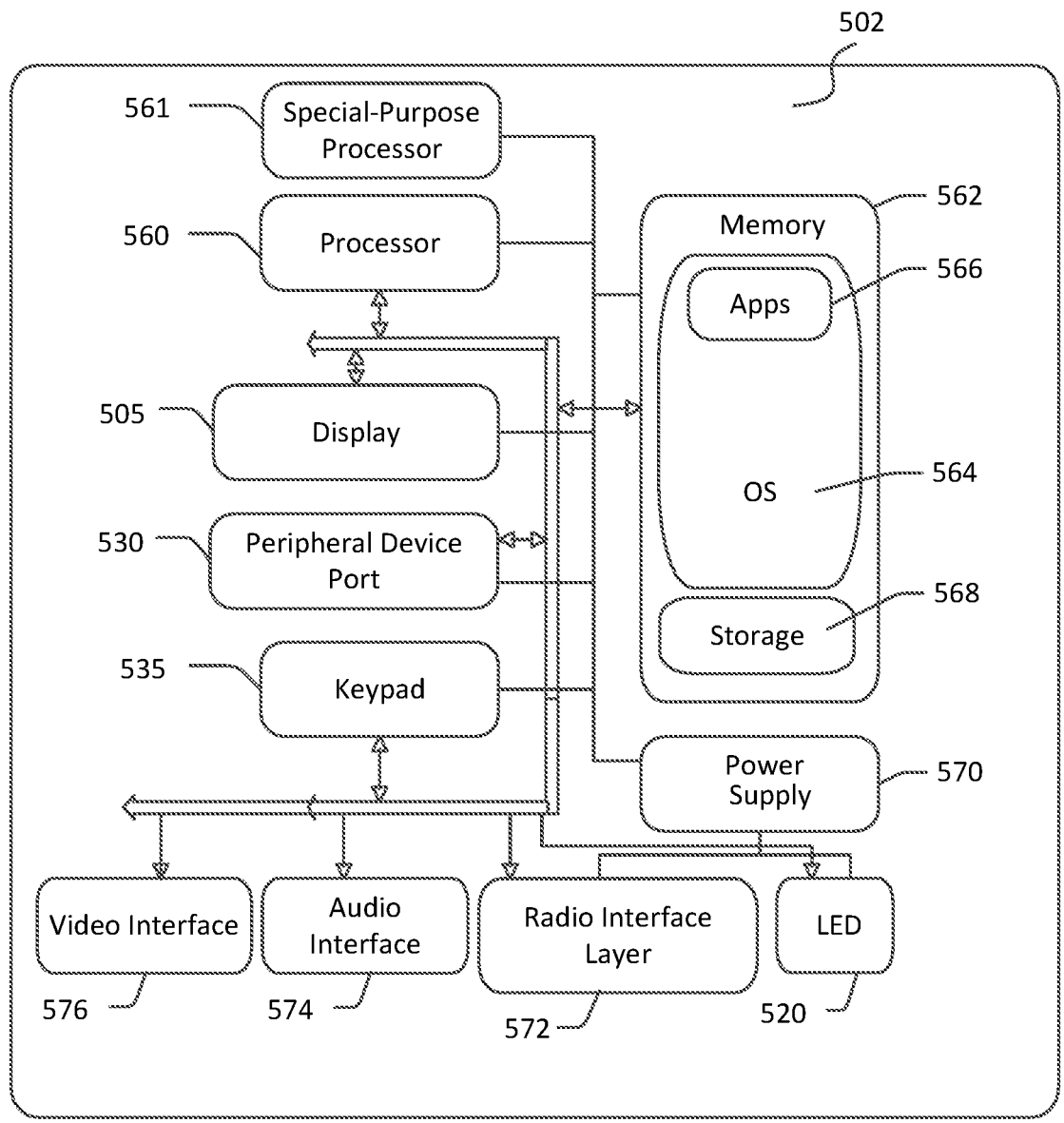

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as email or other messages used by an email application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 may further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via an audio transducer 525 (e.g., audio transducer 525 illustrated in FIG. 5A). In the illustrated embodiment, the visual indicator 520 is a light emitting diode (LED) and the audio transducer 525 may be a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of peripheral device 530 (e.g., on-board camera) to record still images, video stream, and the like. Audio interface 574, video interface 576, and keyboard 535 may be operated to generate one or more messages as described herein.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

As should be appreciated, FIGS. 5A and 5B are described for purposes of illustrating the present methods and systems and is not intended to limit the disclosure to a particular sequence of steps or a particular combination of hardware or software components.

Figure 6:
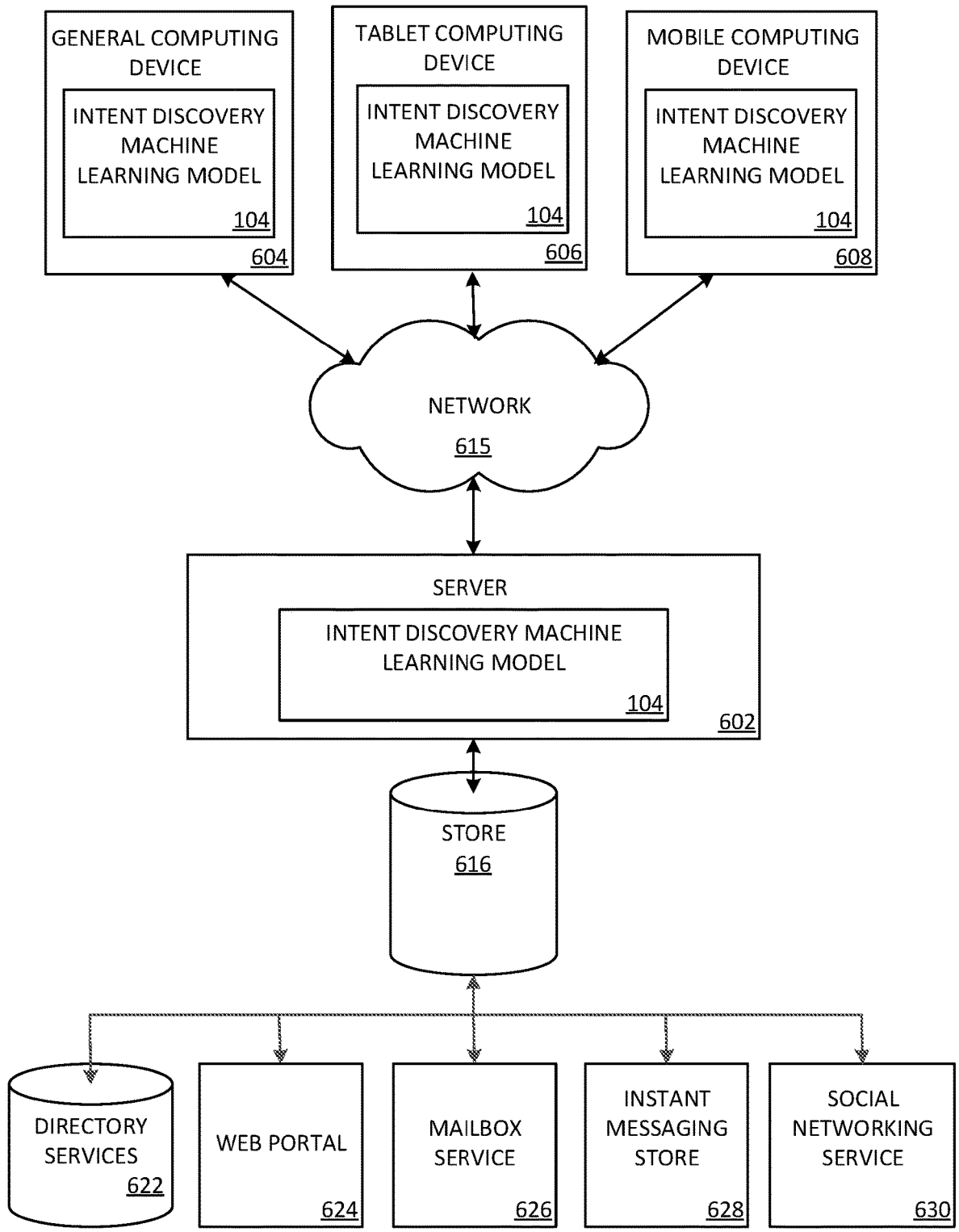
FIG. 6 is a simplified block diagram of a distributed computing system in which aspects of the present disclosure may be practiced.

FIG. 6 illustrates one aspect of the architecture of a system for processing data received at a computing system from a remote source, such as a general computing device 604 (e.g., personal computer), tablet computing device 606, or mobile computing device 608, as described above. Content displayed at server device 602 may be stored in different communication channels or other storage types. For example, various messages may be received and/or stored using a directory service 622, a web portal 624, a mailbox service 626, an instant messaging store 628, or a social networking service 630. The intent discovery machine learning model 104 may be employed by a client that communicates with server device 602, and/or the intent discovery machine learning model 104 may be employed by server device 602. The server device 602 may provide data to and from a client computing device such as a general computing device 604, a tablet computing device 606 and/or a mobile computing device 608 (e.g., a smart phone) through a network 615. By way of example, the computer system described above with respect to FIGS. 4-5B may be embodied in a general computing device 604 (e.g., personal computer), a tablet computing device 606 and/or a mobile computing device 608 (e.g., a smart phone). Any of these embodiments of the computing devices may obtain content from the store 616, in addition to receiving graphical data useable to either be pre-processed at a graphic-originating system or post-processed at a receiving computing system.

As should be appreciated, FIG. 6 is described for purposes of illustrating the present methods and systems and is not intended to limit the disclosure to a particular sequence of steps or a particular combination of hardware or software components.

Figure 7:
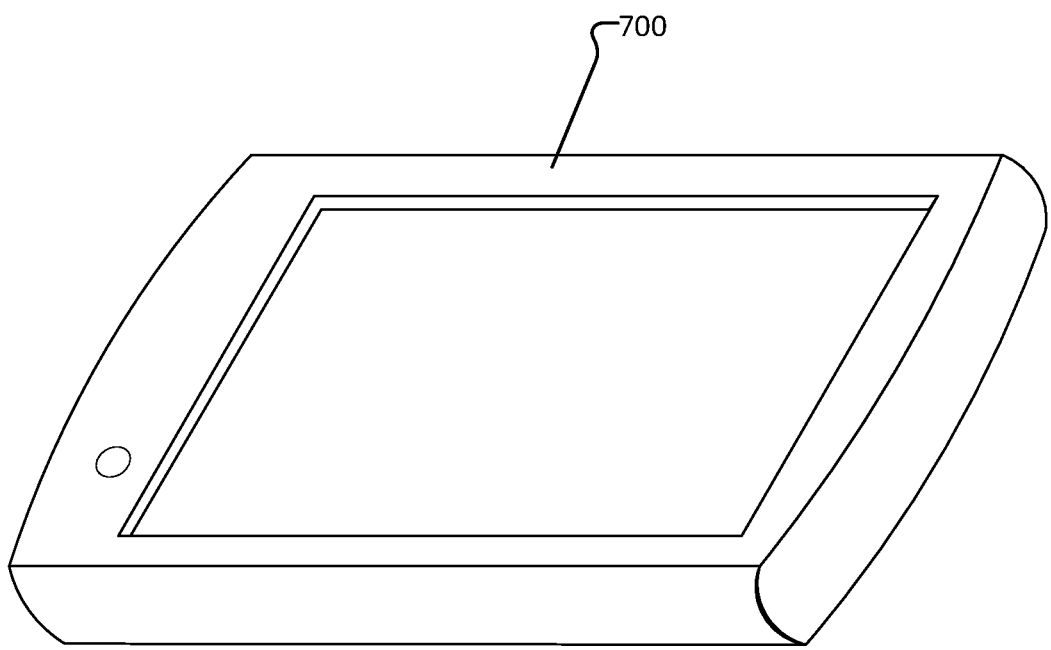
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 7 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method for storing intent data, the intent data corresponding to a plurality of user-problems, the plurality of user-problems related to one or more of a plurality of products, the method comprising:
   identifying each of the plurality of products as a unique base intent node of a base intent level of a hierarchical intent data structure stored in a memory;
   based on a plurality of user-problems, creating a first granularity level below each of the base intent nodes in the hierarchical intent data structure using a grouping process, the first granularity level including one or more groupings of the plurality of user-problems created according to a first common intent feature identified within each grouping; and
   for each grouping of the plurality of user-problems, creating a subsequent granularity level in the hierarchical intent data structure, the subsequent granularity level including one or more sub-groupings of the user-problems of the respective grouping, with each sub-grouping created according to a second common intent feature identified within each sub-grouping, wherein the second common intent feature identified within each sub-grouping is identified exclusive of the first common intent feature.

2. The method of claim 1, wherein the one or more sub-groupings of the plurality of user-problems are created according to a classification process or a clustering process.

3. The method of claim 1, wherein each of the sub-groupings includes a minimum number of user-problems.

4. The method of claim 1, wherein every possible pair of user-problems within each of the sub-groupings has a calculable first correlation and wherein a calculated first correlation of every possible pair of user-problems meets or exceeds a first correlation threshold.

5. The method of claim 1, wherein each of the sub-groupings contains a core user-problem and all other user-problems within the respective sub-grouping comprise non-core user-problems, and wherein every non-core user-problem within the respective sub-grouping has a calculable second correlation with the core user-problem and wherein a calculated second correlation of every non-core user-problem with the core user-problem meets or exceed a second correlation threshold.

6. The method of claim 1, wherein each of the subsequent granularity levels has a minimum number of sub-groupings.

7. The method of claim 1, wherein every possible pair of sub-groupings within a respective subsequent granularity level has a calculable third correlation and wherein a calculated third correlation of every possible pair of sub-groupings within the respective granularity level meets or exceeds a third correlation threshold.

8. A data storage and retrieval system for a computer memory, comprising:
   a processing device to configure the computer memory according to a hierarchical intent data structure and to access data within the hierarchical intent data structure, the hierarchical intent data structure including:
      a base intent level including a plurality of unique intent base nodes, wherein each unique intent base node corresponds to one of a plurality of products;
      a first granularity level beneath each of the unique intent base nodes, wherein the first granularity level includes one or more groupings of a plurality of user-problems related to one of the plurality of products represented by a respective intent base node, the one or more groupings created using a grouping process, and each of the one or more groupings identified with a different determined first common intent feature; and
      a subsequent granularity level beneath each of the one or more groupings of the first granularity level, wherein the subsequent granularity level includes one or more sub-groupings of the user-problems from a respective grouping, each of the one or more groupings identified with a different determined second common intent feature, each of the different determined second common intent features having been determined by excluding the first common intent feature from the determination.

9. The system of claim 8, wherein the plurality of products comprise a plurality of software products.

10. The system of claim 9, wherein the plurality of products have a commonality.

11. The system of claim 8, wherein each of the different determined first common intent features is associated with an answer to at least one of the plurality of user-problems contained in the grouping identified by a respective one of the different determined first common intent features.

12. The system of claim 11, wherein each of the different determined second common intent features is associated with an answer to at least one of the plurality of user-problems contained in the sub-grouping identified by a respective one of the different determined second common intent features.

13. The system of claim 8, wherein the subsequent granularity level has at least a minimum number of sub-groupings.

14. The system of claim 13, wherein every possible pair of the at least minimum number of sub-groupings of the subsequent granularity level has a correlation value that meets or exceeds a correlation threshold.

15. A computer-based method of responding to a user-problem associated with a product, the method comprising:
   receiving the user-problem;

extracting searchable intent terms from the user-problem;
identifying an intent of the user-problem by assessing the searchable intent term against a hierarchical intent data structure, wherein the hierarchical intent data structure includes:
   a base intent level including a plurality of unique intent base nodes, wherein each unique intent base node corresponds to one of a plurality of products;
   a first granularity level beneath each of the unique intent base nodes, wherein the first granularity level includes one or more groupings of a plurality of user-problems related to one of the plurality of products represented by a respective intent base node, the one or more groupings created using a grouping process, and each of the one or more groupings identified with a different determined first common intent feature; and
   a subsequent granularity level beneath each of the one or more groupings of the first granularity level, wherein the subsequent granularity level includes one or more sub-groupings of the user-problems from a respective grouping, each of the one or more groupings identified with a different determined second common intent feature, each of the different determined second common intent features having been determined by excluding the first common intent feature from the determination; and providing an answer to the user-problem based on the identified intent.

16. The method of claim 15, wherein the identified intent comprises at least one of the determined first common intent features or at least one of the determined second common intent features.

17. The method of claim 16, wherein the answer is associated with at least one of the determined first common intent features or at least one of the determined second common intent features.

18. The method of claim 15, wherein each of the sub-groupings includes a minimum number of user-problems.

19. The method of claim 18, wherein every possible pair of user-problems within each of the sub-groupings has a calculable first correlation and wherein a calculated first correlation of every possible pair of user-problems meets or exceeds a first correlation threshold.

20. The method of claim 18, wherein each of the sub-groupings contains a core user-problem and all other user-problems within the respective sub-grouping comprise non-core user-problems, and wherein every non-core user-problem within the respective sub-grouping has a calculable second correlation with the core user-problem and wherein a calculated second correlation of every non-core user-problem with the core user-problem meets or exceed a second correlation threshold.

* * * * *